United States Patent Office 2,743,246
Patented Apr. 24, 1956

2,743,246

METHOD OF POLYCONDENSATION OF ALKYL-ENE-, ALKYLIDENE- AND ARALKYLIDENE-BIS-HALOGEN SUBSTITUTED CARBOXYLIC ACID AMIDES

Rudolf Lotz, Kelsterbach (Main), Germany, assignor to Vereinigte Glanzstoff-Fabriken A. G., Wuppertal-Elberfeld, Germany No Drawing. Application July 18, 1952,
Serial No. 299,734

Claims priority, application Germany July 26, 1951

5 Claims. (Cl. 260—2)

This invention relates to polycondensation, and more particularly to a method of preparing polycondensates from novel bis-halogen substituted-carboxylic acid amides.

The polycondensates according to the invention are obtained by reacting an alkylene-, alkylidene- or aralkylidene-bis-halogen substituted-carboxylic acid amide of the general formula

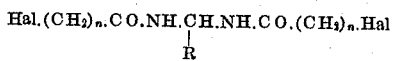

Hal.(CH₂)ₙ.CO.NH.CH.NH.CO.(CH₂)ₙ.Hal
|
R wherein R stands for hydrogen, or an alkyl- or aryl-group, Hal stands for halogen, and n is an integer from 1 to 6, with liquid ammonia in a pressure vessel at normal or slightly elevated temperature, and treating the intermediate product thus obtained, either by treating it in a current of nitrogen at temperatures up to about 250° C., or reacting it with an aliphatic or aromatic dicarboxylic acid such as adipic acid, for example. It is also possible to treat the intermediate product first obtained by heating it, in vacuo, above its melting point. Any of the foregoing methods according to the invention yields polycondensates which are eminently useful plastic materials. The intermediate products obtained in the course of preparation of the polycondensates, are either mono- or diamino compounds of the respective bis-halogen substituted-carboxylic acid amides; their nature and characteristics depend on the prevailing conditions of reaction.

If, for example, liquid ammonia is caused to act in the autoclave, at room temperature, for a period of up to 20 hours, on methylene-bis-chloropropionic acid amide, in the course of which treatment the pressure remains at about 8–10 atm., corresponding to this temperature, a corresponding monoamino compound of the following formula is obtained:

Cl.(CH₂)₂.CO.NH.CH₂.NH.CO.(CH₂)₂.NH₂

This compound has a melting point of 240° C. If this monoamine is treated in a vacuum of 0.5 mm. Hg, and at a temperature of 115° C. in a current of nitrogen, there is obtained while HCl is split off quantitatively in the distillation vessel a light colored polycondensation product which is useful for the production of plastic masses.

If methylene-bis-chloropropionic acid amide is reacted in the autoclave, at a temperature of about 60° C., with liquid ammonia for a period of about 20 hours, a corresponding diamine is formed in accordance with the following equation:

Cl.(CH₂)₂.CO.NH.CH₂.NH.CO.
(CH₂)₂.Cl+2NH₃ - - - →
NH₂.(CH₂)₂.CO.NH.CH₂.NH.CO.(CH₂)₂.NH₂+2HCl

The diamine thus obtained, which has a melting point of 140° C., can also be condensed with adipic acid and yields a polycondensate having a linear structure. It is excellently suited for the production of plastic masses.

The invention will be more fully described by reference to the following specific examples. It should be understood, however, that the examples are given by way of illustration only and that the invention is not to be limited by the details set forth therein.

Example I 200 grams of methylene-bis-chloropropionic acid amide are treated, in the autoclave and at normal temperature, with 1000 cc. of liquid ammonia. The reaction may last up to 20 hours. A homogeneous solution is formed which after evaporation of excessive ammonia, leaves a semi-solid mass. After working down and purification there is obtained the corresponding monoamino compound of the following formula:

Cl.(CH₂)₂.CO.NH.CH₂.NH.CO.(CH₂)₂.NH₂

This monoamine has a melting point of 240° C.

This compound is melted while introducing nitrogen at normal pressure, and is heated in a vacuum of 2 mm. Hg to about 180°–190° C., which temperature is maintained for 3 hours. In the course of condensation hydrochloric acid is split off. The lightly colored condensation product remaining in the distillation vessel when the reaction is completed, lends itself to the production of plastic masses.

Example II 200 grams of methylene-bis-chloropropionic acid amide and 1000 cc. of liquid ammonia are heated in the autoclave for up to 20 hours at a pressure of up to about 20 atm. and a temperature of about 60° C. A homogeneous liquid is formed. Upon evaporation of excessive ammonia and after removal of inorganic reaction products, a solid product is obtained which has a melting point of 140° C. and is the diamine of the methylene-bis-chloropropionic acid amide.

Thereafter, 188 grams of the diamine thus obtained, together with 146 grams of adipic acid, are heated with reflux in 2 liters of ethanol for 3 hours. When the reaction is terminated and after suction filtering from a small residue of insoluble matter, the lightly colored condensation product is concentrated in vacuo. A polycondensate having a melting point of 215°–220° C. is thus obtained.

Example III 100 grams of ethylidene-bis-chloropropionic acid amide are treated with 1000 cc. of liquid ammonia for up to 20 hours, at room temperature, in the autoclave, at a pressure of about 8–10 atm. A homogeneous liquid is formed which on evaporation of the excess of ammonia, leaves behind a semi-solid mass. From this mass a solid product is isolated which melts at 185°–190° C. It is the monoamine of the ethylidene-bis-chloropropionic acid amide of the following formula:

Cl.(CH₂)₂.CO.NH.CH.NH.CO.(CH₂)₂.NH₂
|
CH₃

20 grams of this compound are melted while introducing nitrogen at normal pressure, and thereafter are further condensed under reduced pressure (about 0.5 mm. Hg). After the reaction has proceeded for 3–5 hours there remains in the distillation vessel, a lightly colored polycondensation product which can be used for the manufacture of plastic materials.

While I have disclosed the preferred embodiments of my invention and the preferred modes of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:
1. The process of preparing a light colored condensation product of a mono-amine of the general formula

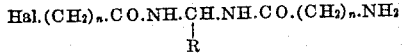

wherein Hal means halogen, $n$ is an integer from 1 to 6 and R is a member of the group consisting of hydrogen and methyl, which comprises reacting a bis-amide of the general formula

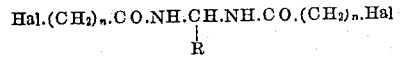

wherein Hal, $n$ and R have the same meanings, respectively, with one mol of liquid ammonia at room temperature to form the mono-amine, separating the mono-amine, maintaining the mono-amine in molten condition in a current of gaseous nitrogen at a temperature up to about 250° C., and heating the mono-amine further under reduced pressure to effect condensation of the amine and elimination of hydrogen chloride.

2. The process of claim 1, wherein the current of nitrogen gas is at normal pressure.

3. The process of claim 1, wherein the heating of the mono-amine to effect condensation is carried out at a pressure of from 0.5 to 2.0 mm. mercury for a period of from 3 to 5 hours.

4. The process of claim 1, wherein the bis-amide is methylene-bis-chloropropionic acid amide.

5. The process of claim 1, wherein the bis-amide is ethylidene-bis-chlorpropionic acid amide.

References Cited in the file of this patent

UNITED STATES PATENTS

| | | |
|---|---|---|
| 2,109,929 | Rigby | Mar. 1, 1938 |
| 2,338,177 | Graenacher et al. | Jan. 4, 1944 |

FOREIGN PATENTS

| | | |
|---|---|---|
| 882,106 | France | Feb. 15, 1943 |